Nov. 9, 1965 F. A. SCHWERTZ 3,217,330

ELECTROSTATIC PRINTING UTILIZING PRINT-THROUGH RECORDING

Filed Aug. 29, 1960 2 Sheets-Sheet 1

INVENTOR.
FREDERICK A. SCHWERTZ

BY Stanley Z. Cole

ATTORNEY

INVENTOR.
FREDERICK A. SCHWERTZ
BY
Stanley Z. Cole
ATTORNEY

United States Patent Office 3,217,330
Patented Nov. 9, 1965

3,217,330

ELECTROSTATIC PRINTING UTILIZING PRINT-THROUGH RECORDING

Frederick A. Schwertz, Pittsford, N.Y., assignor to Xerox Corporation, a corporation of New York Filed Aug. 29, 1960, Ser. No. 52,700
8 Claims. (Cl. 346—74)

This invention relates to electrostatic recording and reproduction of images.

In recent years there have been developed various types of electronic machines such as digital computers, accounting and tabulating machines, facsimile transmission machines and the like which produce information at high rates of speed. Ordinary mechanical recording devices are too slow and are too cumbersome to handle the outputs involved at the operational speeds of these devices. Accordingly, there have come into being techniques and devices to record as electrostatic images the information developed by these high speed devices. The electrostatic images are made visible by developing with powdered or inked materials and the visible image is generally fused or dried to make the output information permanent.

Electrostatic read-out systems in general involve positioning a recording web, generally of insulating material, against an electrode and at a slight distance from one of a number of possible recording heads positioned opposite the electrode. An electric impulse is then applied to and generally through the recording web to result in the deposition of an electrostatic charge pattern on the recording web. The web is then generally moved to a new point and developed, thus making the charge pattern visible and the information available for use. Prior art devices utilizing these techniques are described, for example, in U.S. Patents 2,919,170 and 2,919,171.

Now, according to this invention, it has been found that increased operational reliability, together with images of better quality and better resolution, are produced when the recording web comprises a relatively conductive layer bearing an insulating surface layer, and the web is positioned with the conductive portion in physical contact with the recording heads and with the insulating portion spaced from an electrode positioned on the opposite side of the recording web.

It is therefore an object of the present invention to provide improved electrostatic recording techniques and apparatus.

It is a further object of this invention to improve high speed recording devices of the read-out type.

It is a further object of this invention to provide a novel recording device for high speed print-out of information in which a relatively conductive surface of the recording web is positioned against a recording head and in which the opposite and an insulating surface is spaced from an electrode at the point of electrostatic image formation on the recording web.

For a better understanding of the invention, as well as other objects and further features thereof, reference is had to the following detailed description thereof to be read in conjunction with the accompanying drawings, wherein.

Figures 1, 2:
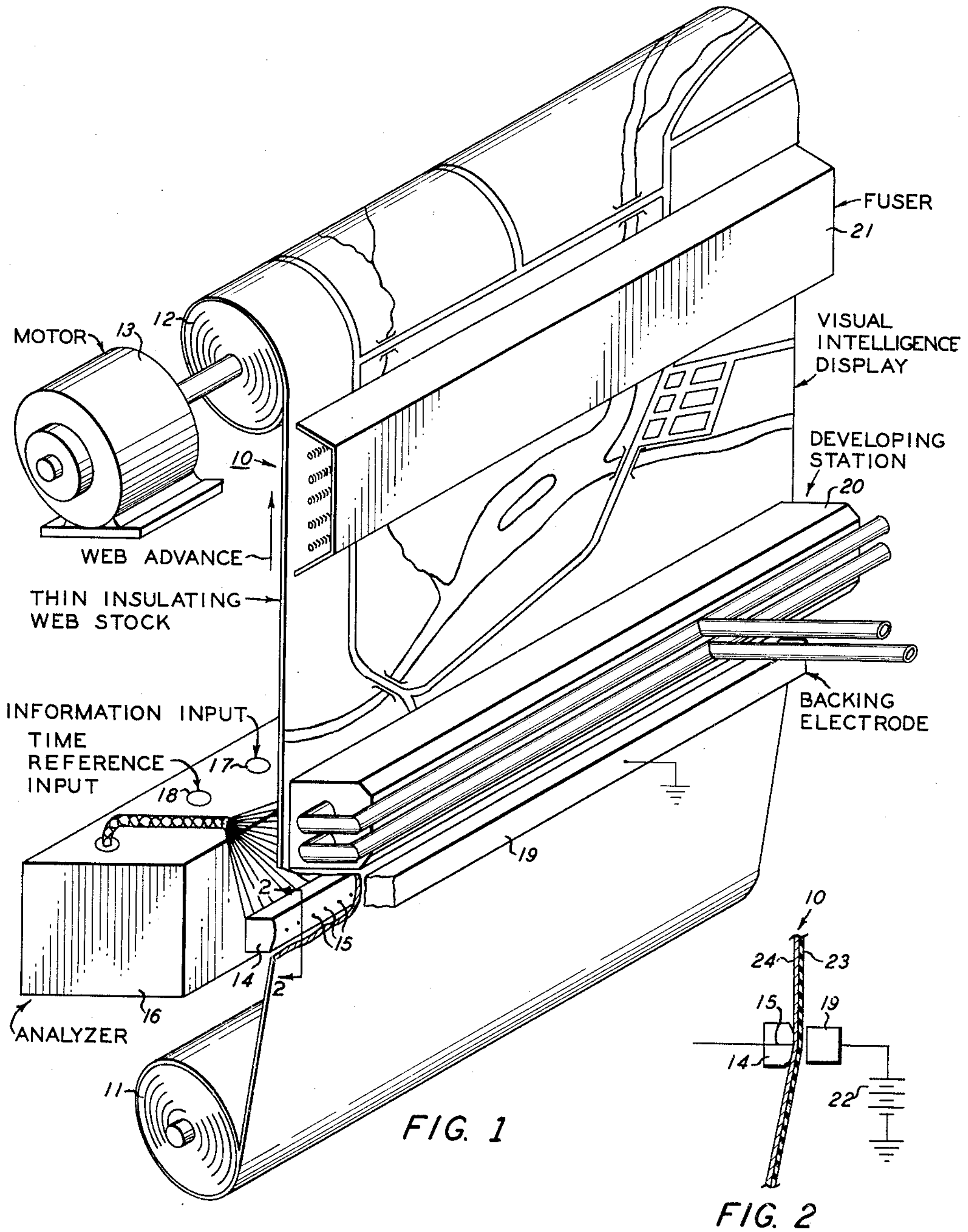
FIG. 1 is a schematic perspective view showing an embodiment of an electrostatic recording device according to the invention.
FIG. 2 is a section taken along lines 2—2 of FIG. 1.

Referring now to FIGURES 1 and 2, the electrostatic recording device includes a dielectric recording web material 10 which is fed from supply roll 11 to takeup roll 12 by means of motor 13. After leaving supply roll 11, web 10 passes over and in contact with insulating block 14. Insulating block 14, as shown, is provided with a linear array of pin-like print electrodes 15 which extend through the block and each of which is connected to analyzer 16 provided with an information input 17 and a time reference input 18. A backing electrode 19, grounded (FIG. 1), connected to a bias voltage 22 (FIG. 2) or the like including connection to a voltage source for controlled pulsing, is mounted opposite block 14 on the other side of web 10 and spaced slightly apart therefrom. Analyzer 16 is supplied with suitable electrical wave forms representative of pictorial, alphanumeric, or other information to be recorded and converts these wave forms into suitably timed and distributed electrical pulses which are applied to electrode 15 in such a way that each electrode is energized whenever it contacts a portion of web 10 upon which a mark is desired to be reproduced. Suitable electronic circuitry for use in analyzer 16 is described in the Schwertz patent application, Serial No. 683,647, dated September 12, 1957. As will be further described, the application of a suitable voltage pulse to an electrode 15 causes the creation of a small area of electrostatic charge on an adjacent area of web 10 and there is thus formed on web 10 through selection and pulsing a pattern of electrostatic charges corresponding to the information to be recorded. Web 10 next passes by a developing station 20 whereat finely divided marking particles are selectively deposited on the electrostatic pattern, thereby making it visible. Web 10 next passes fuser 21 which contains heating elements to soften either or both of web 10 and the marking particles applied at developer station 20 to cause the particles to be permanently bonded and affixed to the web. Various forms of developing and fixing apparatus are known in the electrostatic recording art, and may be substituted for those shown in this figure. Further, instead of fusing powder images on web 10, it is possible to transfer the images to another sheet or surface by electrostatic transfer or other known transfer methods. Thus, the powder images, particularly if formation of resinous powders, can be transferred and affixed to paper offset maps for use in making multiple copies by offset printing or the like.

FIG. 2 is a cross-sectional view along lines 2—2 of FIG. 1 and shows in greater detail the relative arrangements of web 10, insulating block 14, print electrodes 15 and backing electrode 19. As shown, web 10 passes over and in contact with insulating block 14 and print electrodes 15 extend through block 14 and terminate flush with the surface of block 14 which is contacted by web 10. The principal purpose of insulating block 14 is to provide a smooth surface over which web 10 may be drawn so that the web may contact the print electrodes 15 without being torn or abraded by the electrodes. Backing electrode 19, as shown, is spaced slightly apart from web 10. As will be further described later, the preferred spacing between web 10 and electrode 19 is generally about .004 to .005 inch. Web 10, as shown in this figure, comprises a good electrically insulating film 23, such as a plastic film, supported on a resistive or relatively more electrically conductive support layer 24, such as paper. Further, as illustrated in this figure, the conductive portion 24 of web 10 is positioned in contact with electrodes 15.

Figure 3:
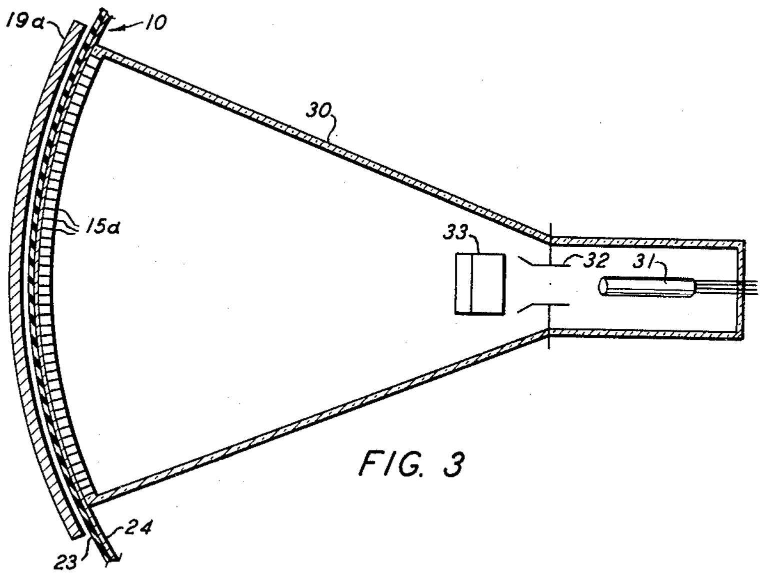
FIG. 3 is a schematic sectional view of a further embodiment of an electrostatic recording system; and, FIG. 4 includes schematics and equivalent circuits comparing the present invention to the prior art.

FIG. 3 is a schematic sectional view of a further electrostatic recording system according to the invention. As illustrated, the system includes a cathode ray tube 30 with a cylindrical (rather than spherical) end. The tube is provided with the conventional internal elements such as a variable intensity electron gun 31, vertical deflection plates 32 and horizontal deflection plates 33, although magnetic deflection means may also be used. A dielectric recording web material 10, comprising a conductive portion 24 and insulating portion 23, is maintained in contact with the end of tube 30 and a cylindrical backing electrode 19*a* is maintained at a uniform spacing of about .004 to .005 inch from the back of web 10. Electrode 19*a*, while different in form, is functionally identical to electrode 19 of FIGURES 1 and 2. A two-dimensional array of pin-like print electrodes 15*a* is provided in the end of cathode ray tube 30. Each electrode extends at least completely through the otherwise insulating end of cathode ray tube 30. Whenever an electrode 15*a* is touched by the cathode ray beam, it is instantaneously raised to a high potential. Electrodes 15*a* are therefore functionally equivalent to electrodes 15 in FIGURES 1 and 2.

In operation, cathode ray tube 30 is connected to conventional electronic circuits similar to those used in a television receiver which serve to modulate the electron beam and deflect it across the end of the cathode ray tube to delineate an image thereon. Every time an electrode 15*a* is struck by the sweeping electron beam it is raised to a high potential and causes the formation of an area of electrostatic charge on an adjacent area of web 10. There is thus formed on web 10 an electrostatic latent image corresponding to the information signal applied to the cathode ray tube. Web 10 will normally remain stationary during image formation and then advance to a new position in readiness for the formation of a new image. Where web 10 is in motion during image formation, the vertical deflection plates 32 may be dispensed with and electrode 15*a* may comprise a single horizontal row rather than a two-dimensional array. Web 10 may also be used in the form of individual sheets, a new sheet being supplied for each image formation step. After a latent image is formed on web 10, it may be transferred to development and fixing apparatus such as those illustrated in FIG. 1.

Figure 4:
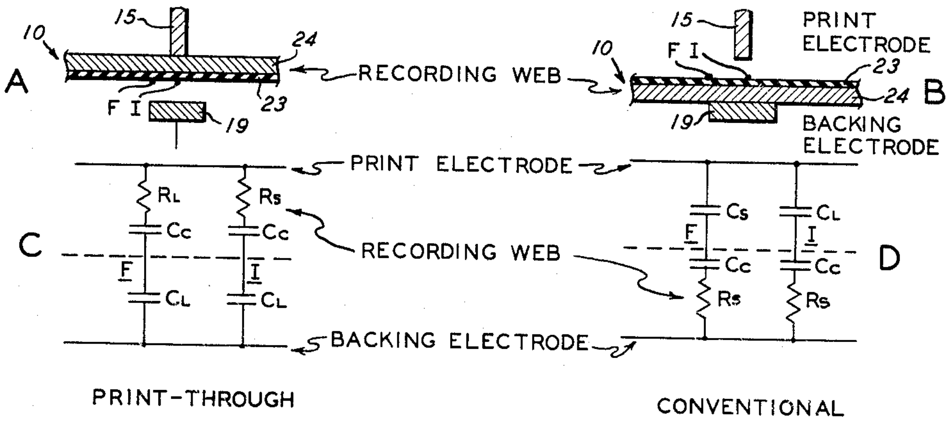

Referring now to FIG. 4, there is illustrated in FIG. 4–A a schematic of the present invention, in FIG. 4–B a schematic of conventional electrostatic printing devices, in FIG. 4–C the circuit arrangement of FIG. 4–A, and in FIG. 4–D the circuit arrangement for FIG. 4–B. Referring now to FIG. 4–A, print electrode 15 is positioned in contact with web 10 which is spaced from backing electrode 19. In FIG. 4–B one form of the conventional arrangement is illustrated wherein print electrode 15 is spaced from web 10 while web 10 is positioned in contact with backing electrode 19. In both embodiments the application of a voltage of sufficient magnitude between electrodes 15 and 19 causes an electrical discharge in the indicated air gap with resulting deposition of electrostatic charge on web 10. A preferred web material 10 is illustrated in both FIGS. 4–A and 4–B. This material comprises a layer of paper 24 or the like overcoated with an insulating plastic 23, such as polyethylene, terephthlate, polystyrene, cellulose acetate, ethyl cellulose, or like material of good insulating properties and preferably of the order of 1 or 2 mils thick. The paper 24 may be characterized as a highly electrically resistive material. In FIG. 4–A the insulating coating 23 faces electrode 19 and the resistive backing 24 faces print electrode 15. In FIG. 4–B insulating coating 23 faces print electrode 15 and resistive layer 24 is in contact with electrode 19.

Both the conventional technique of printing and the technique of apparatus of the instant invention have been employed using a film of insulating material without any resistive layer. However, when using the web material defined above, far superior results have been attained. When a purely insulating material is employed, the rubbing of the insulating material as it moves relative to and against electrodes which are generally of a different material produces static charges along the web which are developed during the developing procedure, thus creating spurious and uncontrolled deposit of particles and poor quality developed images. Also, positioning the web material 10 so that the insulating layer faces character electrode 15 while the relatively conductive layer 24 contacts electrode 19 resulted in extremely poor quality images when images were produced. Accordingly, the critical arrangement for operation in accordance with this invention is illustrated in FIG. 4–A. With this arrangement the problem of spurious deposits of frictional charges was overcome.

Although layer 24 has been referred to as resistive or relatively conductive, a critical value of conductivity or resistivity is required in connection with this invention. In particular, this layer cannot be a pure conductor so that it acts as a shield which prevents the creation of the desired fields and electrostatic image formation in accordance with the concepts of field discharge involved herein. In fact, it must be sufficiently resistive to act substantially as an insulator during the time of pulsing or during the time of image formation. Thus, its relaxation time should be sufficiently great to prevent resistive layer 24 from acting as a shield during image formation. Following image formation, this layer should be sufficiently conductive to allow dissipation of any spurious charges deposited during moving contact between web 10 and electrode 15. Typically, paper has been used. Generally, the paper is treated to have a 3% water content at the time of manufacture and then wrapped in a waterproof container so that at the time of use it still has this content. It is believed that this water content is equivalent to paper allowed to absorb moisture from the air under normal humidity conditions generally above about 40% relative humidity. Obviously, the necessary resistivity of the paper is dependent on the time constant or width of the pulse applied between the electrodes. As an example of a working arrangement, when using a 1500 volt pulse it has been found that the paper just described is operable within the scope of this invention using a pulse width between about 2 microseconds to about 1 second. It is noted, however, that the results in this range are nonlinear in that results up to about 400 microseconds seem about the same. Then between about 15 milliseconds to about 100 milliseconds results are poor. They improve between about 215 milliseconds through about 1 second. This same paper has also operated with different voltages and its resistivity has been measured as $4 \times 10^{10}$ ohm centimeters in a room having a relative humidity of 17% using a Hart Moisture Meter, type K–103, manufactured by Hart Moisture Meters, 336 West Islip Boulevard, West Islip, New York.

The electrical circuits in FIGS. 4–C and 4–D include a comparison for a point on the coated paper in image areas and a point on the paper in fringe areas. Points I and F are such points respectively and are included in FIGURES 4–A, –B, –C and –D. This distinction has been made since improved sharpness is characteristic of images formed according to this invention as compared to conventional image formation and an analysis of the circuit differences suggest a possible reason for the improved results.

Considering further FIGURES 4–C and 4–D, improved sharpness may be explained by circuit differences. The elements include $C_C$ as the capacity of the paper coating, $C_L$ as the capacity from the surface of the paper directly to the electrode. $C_L$ is considerably larger than $C_S$ which is the capacity from the fringe point to the character electrode. $R_S$ is the resistance directly through the thickness of the paper while $R_L$ is the much larger resistance from a point in the fringe area to the character electrode. In FIG. 4–C one element is different in the two branches of the circuit and in FIG. 4–D one element is different in the two branches of the circuit. It is now believed that the difference between printed or non-printed edge areas or electrostatic sharpness of the image may be determined by the difference between $R_L$ and $R_S$ in the case of this invention, and between $C_L$ and $C_S$ in the case of conventional electrostatic print-out systems. In other words, the vastly improved sharpness of the print-through method of this invention is explained at least in part when one considers the recording gap and the material therein as an R-C circuit, taking image areas and fringe areas which are more remote from the gap defined by the two electrodes as parallel R-C circuits considering the resistive paper as the resistor in the circuit and the insulating coating on the paper and the air gap as the capacitive elements in the circuit with breakdown occurring across the air gap in all instances when recording occurs. When the conventional recording technique, as shown in FIGS. 4–B and 4–D, is employed with the resistive paper layer 24 adjacent the broad backing electrode, the resistive path length from the backing electrode to point F on the insulating coating 23 is equal to the path length from the backing electrode to the point I on the backing electrode and since the material is the same through both paths, the resistor in the equivalent circuit is the same in fringe areas as it is in image areas. Consequently, any differences in the equivalent R-C circuit must depend on differences in capacitance in the system from the print electrode to the fringe area F as compared with the capacitance from the print electrode to the image area I. As seen in FIG. 4–D, these two capacitances are identified as $C_S$ and $C_L$, respectively. In order for there to be a significant difference between $C_S$ and $C_L$, the print electrode 15 must be extremely close to the surface of insulating coating 23 because as the print electrode is moved away from this surface, the distance from the print electrode to point F begins to approach very closely the distance between the print electrode and point I and $C_S$ and $C_L$ are virtually equal. This being the case with the capacitors and the two resistors in the two parallel R-C circuits also being equal, it will be found that the two parallel R-C circuits will charge at approximately the same rate whenever the print electrode spacing is fairly wide. Thus, a fuzzy image will be produced, because fringe areas of the image tend to be charged to the same extent as image areas. This, in fact, has proven out in practice and it has been found that with the conventional system, extremely close spacings with very uniform control must be maintained in order to secure even reasonably legible images. Contrasting this with the print-through system of the instant invention, as seen in FIGS. 4–A and 4–C and considering this technique on the same basis of a pair of parallel R-C circuits for fringe and image areas, it will be seen that the resistive path length through the paper to surfaces of the insulating coating in fringe areas vs. that in image areas is quite different in length so that the resistance in each equivalent circuit is very different. Since the path length from the printing pin electrode 15 to point F is significantly longer than that from the printing electrode 15 to point I, its resistance, $R_L$, is significantly higher than $R_S$. Because the R-C circuit through point I has a significantly smaller resistance in series with the same size capacitor, this capacitor will charge up at a much faster rate than the capacitor through the fringe area, identified as point F and, accordingly, the image produced will be much sharper in nature because of its higher charge density. Since the broad backing electrode 19 spans both points F and I on the insulating coating, the capacitance from this backing electrode through points F and I is equal regardless of the spacing of the backing electrode from the coated recording web. Accordingly, the spacing is non-critical in nature. As should be apparent in both cases, this results in a difference in the electric field strength at the image and fringe points. In the conventional system the resolution depends on the magnitude of the $C_L/C_S$ ratio. This ratio is large at small gaps and such gaps are used to form images through electrostatic discharge phenomenon. In fact, experience has shown that the best conventional images are made with as small a gap as the mechanical and electrical characteristics of the system permit. However, excessively small gaps hinder electrical discharge and create serious practical mechanical problems. Where the gap is made very small it becomes increasingly difficult to maintain the gap uniform. According to this invention, however, resolution depends on the magnitude of the $R_L/R_S$ ratio. This ratio can be made very large simply by employing a thin paper layer, and generally the resistive layer is smaller than the gap of the conventional system. A thin paper layer does not impede electrical discharge and does not call for any higher degree of mechanical perfection in the system.

Further, the distinction between resistive and capacitive ratios may play some part in producing images of better resolution.

Various gaps have been included between the backing electrode and the web material. With air in the gap a gap of about 4 or 5 mils and a pulse amplitude of about 900 volts has been found optimum for highest quality printing. It has also been found that an increase or decrease in gap requires a commensurate increase or decrease in voltage of about 160 volts per mil change. Generally, however, it is preferred to operate above about 3 mils of air gap. Typically, when employing a gap of 3 mils or less, images including halos are formed and image formation is frequently incomplete. As the gap increases above about 10 mils, image sharpness as well as image contrast decreases in quality rapidly.

Generally, a D.C. bias voltage is applied to backing electrode 19 in respect to print electrodes 15. This bias voltage is to apply part of the potential necessary for breakdown, but an insufficient amount of potential to break down the gap. This simplifies the pulse requirements for image formation. In effect, if the threshold point is 600 volts and 550 volts are applied as a bias potential, then only about a 50-volt pulse is necessary to break down the gap. In practice, 800 to 900 volts more than the breakdown voltage will be used for image formation. Thus, in the example given, a pulse of about 850 volts would be applied in order to print. It should be noted that when web 10 is moving at a high rate of speed, ionization and image formation must take place in a very short time to prevent blurring or smearing of the formed image pattern, and short voltage pulses in the microsecond range are accordingly desirable.

The term "field discharge" as used throughout is intended to mean a field-induced silent electric discharge between the electrode and the interposed web including an insulating layer resulting in the formation of an electrostatic charge pattern on the insulating layer. This type of discharge is not like a spark discharge, but creates a conductive gap whereby charges flow for deposition to the insulating surface. Generally, it can be considered a cold discharge, and generally also, image formation occurs in the absence of other phenomenon such as thermionic emission. Also, in forming images according to this invention, it is not intended to mean image formation through chemical or physical changes in the recording web. The specific nature of the discharge is dependent on various elements and factors such as the potentials, the field strength, the electrode materials, the fluid of the gap, whether air or other gas or liquid, the pressure and the like. For more discussion of this type of discharge, reference may be had to issued patents in this art.

While the present invention, as to its objects and advantages, has been described herein as carried out in specific embodiments thereof, it is not intended to be limited thereby, but it is intended to cover the invention broadly within the spirit and scope of the appended claims.

What is claimed is:

1. The method of electrostatic recording in air at atmospheric pressure which comprises bringing an array of pin-like print electrodes into substantially uniformly closely spaced relationship with a facing conductive backing electrode, positioning a recording web comprising a highly insulating surface coating on a paper layer between said print electrode array and said backing electrode with said paper layer in physical contact and facing said print electrode array and with said insulating layer facing and spaced by a gap of between about 3 to 10 mils from said backing electrode, and producing an electric field between selected print electrodes and said backing electrode sufficient to produce a field discharge to form an electrostatic charge pattern on said web corresponding to the pattern of said selected electrodes.

2. The method of claim 1 in which the voltage to produce field discharge is applied for a time between about 2 microseconds to about 1 second.

3. The method of recording which comprises advancing a recording web comprising a highly insulating layer overlying a more conductive backing parallel to its surface substantially perpendicularly past a linear array of pin-like print electrodes, said web being positioned with said more conductive backing in physical contact with said linear array of print electrodes, applying short voltage pulses between selected print electrodes and a backing electrode positioned facing said insulating layer of said web in accordance with information to be recorded and of sufficient intensity to create a sufficient electric field to create a silent discharge in conformity with the information to be recorded producing a two-dimensional electrostatic charge pattern on said recording web while maintaining its original characteristics.

4. The method of recording which comprises positioning a highly insulating layer overlying a paper base between a backing electrode and an array of mutually insulated pin-like print electrodes which extend into a vacuum chamber, said paper base being in contact with said print electrodes and said insulating layer being closely spaced from said backing electrode, and delineating an image across the ends of said print electrodes within said vacuum chamber with an electron beam thereby producing on said insulating sheet material an electrostatic latent image corresponding to said electron beam image.

5. The method of electrostatic recording which comprises positioning the ends of a plurality of mutually insulating pin-like print electrodes a uniform distance from a common backing electrode, thereby forming a printing gap, positioning a recording member which is thinner than the width of said recording gap and which is made up of a highly insulating layer overlying a more conductive but highly resistive base layer with said base layer in contact with the end faces of said pin-like print electrodes and applying an electrical potential between selected ones of said pin-like print electrodes and said backing electrode, said potential being of sufficient magnitude to initiate an ionizing field discharge between said selected pins and said backing electrode whereby an electrostatic charge pattern in the shape of the end faces of said selected pin-like print electrodes is formed on said recording member.

6. A method according to claim 5 in which said print and backing electrodes are spaced apart a distance sufficient so that said backing electrode is from about 3 to about 10 mils from said recording member when said recording member is placed in said recording gap.

7. The method of electrostatic recording comprising placing a plurality of mutually insulated pin-like electrodes with their end faces a uniform distance from a common backing electrode thereby forming a recording gap, placing a recording member which is thinner than said recording gap and which is made up of a highly insulating material having a resistivity of at least $10^{12}$ ohm cm. on a base layer having a resistivity no more than about $4 \times 10^{10}$ ohm cm. with said less resistive base layer in contact with the end faces of said pin-like print electrodes and applying an electrical potential between selected ones of said pin-like electrodes and said common backing electrode, said electrical potential being of sufficient magnitude to initiate an ionizing field discharge between said selected electrodes and said common backing electrode thereby producing electrostatic charge patterns on said recording member in the shape of the end faces of said pin-like print electrodes.

8. A method according to claim 7 including positioning the end faces of said pin-like print electrodes with respect to said common backing electrode so that said backing electrode is from about 3 to about 10 mils from said recording member when it is placed in said recording gap in contact with said pin-like print electrodes.

References Cited by the Examiner

UNITED STATES PATENTS

| | | | |
|---|---|---|---|
| 2,919,171 | 12/59 | Epstein et al. | 346—74 |
| 3,068,479 | 12/62 | Benn et al. | 346—74 |

FOREIGN PATENTS

| | | |
|---|---|---|
| 1,077,037 | 11/54 | France. |
| 1,224,349 | 6/60 | France. |
| 734,909 | 8/55 | Great Britain. |
| 784,450 | 10/57 | Great Britain. |

IRVING L. SRAGOW, *Primary Examiner.*

NEWTON N. LOVEWELL, *Examiner.*